United States Patent [19]
Araki et al.

[11] Patent Number: 5,637,398
[45] Date of Patent: Jun. 10, 1997

[54] POLYESTER FIBER

[75] Inventors: Yoshio Araki; Motoki Kataoka, both of Ohtsu; Itsuro Tanaka, Okayama-ken, all of Japan

[73] Assignee: Toyo Boseki Kabushiki Kaisha, Osaka, Japan

[21] Appl. No.: 430,540

[22] Filed: Apr. 25, 1995

Related U.S. Application Data

[63] Continuation of Ser. No. 33,516, Mar. 18, 1993, abandoned, which is a continuation-in-part of Ser. No. 795,784, Nov. 21, 1991, abandoned.

[30] Foreign Application Priority Data

Nov. 26, 1990 [JP] Japan ..................... 2-323920
Mar. 12, 1991 [JP] Japan ..................... 3-074131
Jul. 8, 1991 [JP] Japan ..................... 3-194879

[51] Int. Cl.$^6$ ........................ D02G 3/00; C08G 63/688
[52] U.S. Cl. ........................ 428/364; 528/272; 528/295; 528/301; 528/302; 528/307; 528/308.6; 525/437
[58] Field of Search .................... 528/272, 295, 528/301, 302, 307, 308.6; 428/364; 525/437

[56] References Cited

U.S. PATENT DOCUMENTS

| | | | |
|---|---|---|---|
| 3,732,183 | 5/1973 | Popp et al. ................ | 528/287 |
| 4,377,682 | 3/1983 | Ohguchi et al. ............ | 528/301 |
| 4,622,381 | 11/1986 | Suzuki et al. ............. | 528/295 |
| 5,171,308 | 12/1992 | Gallagher et al. .......... | 604/372 |

FOREIGN PATENT DOCUMENTS

| | | |
|---|---|---|
| 34-10497 | 12/1959 | Japan . |
| 47-22334 | 6/1972 | Japan . |
| 57-63325 | 4/1982 | Japan . |
| 57-66119 | 4/1982 | Japan . |
| 58-126376 | 7/1983 | Japan . |
| 59-30903 | 2/1984 | Japan . |
| 59-47485 | 3/1984 | Japan . |
| 59-66580 | 4/1984 | Japan . |
| 59-71487 | 4/1984 | Japan . |
| 59-71488 | 4/1984 | Japan . |
| 63-52663 | 10/1988 | Japan . |
| 2-19228 | 5/1990 | Japan . |

*Primary Examiner*—Samuel A. Acquah
*Attorney, Agent, or Firm*—Leydig, Voit & Mayer, Ltd.

[57] ABSTRACT

The present invention is a polyester fiber formed from a polyester copolymer of dicarboxylic acid and diols. The dicarboxylic acid of the present invention has associated therewith a metal sulfonate group and at least one molecular terminal blocked by a sulfonate compound. The copolymer has the following structure:

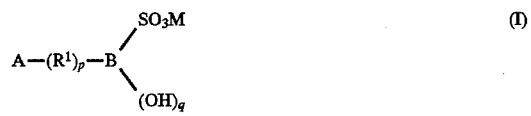

wherein

A is an ester-forming functional group, B is a phenyl group or a naphthyl group, $R^1$ is an aliphatic hydrocarbon group having 1 to 20 carbon atoms, an alicyclic hydrocarbon group having 3 to 20 carbon atoms, or an aromatic hydrocarbon group having y to 18 carbon atoms, M is an alkali metal or an alkaline earth metal, p and q are independently 0 or 1.

14 Claims, No Drawings

POLYESTER FIBER

CROSS-REFERENCE TO RELATED APPLICATION

This is a continuation of application Ser. No. 08/033,516 filed on Mar. 18, 1993, now abandoned which is a continuation of Ser. No. 07/795,784, filed Nov. 21, 1991, abandoned.

BACKGROUND OF THE INVENTION

1. Field of the Invention

The present invention relates to a polyester fiber which is excellent in properties such as dyeability with cationic dyes, easy dyeability under atmospheric pressure at a temperature of about 100° C., resistance to light, resistance to hydrolysis, and a high fiber strength.

2. Description of the Prior Art

Since aromatic polyesters represented by polyethylene terephthalate are excellent in mechanical properties, resistance to light, resistance to heat and resistance to chemicals, they have been widely used as fibers, films, and other shaped articles. However, when the aromatic polyesters are used as fibers, they have to be dyed under high-temperature, high-pressure conditions or have to be subjected to carrier-dyeing. In addition to such economic and operational drawbacks, they have further disadvantages that they are difficult to dye into brilliant colors.

In order to overcome these drawbacks, a polyester which comprises, as its copolymer components, a compound having an acidic group such as 5-sodium sulfoisophtalic acid has been proposed (Japanese Patent Publication No. 34-10497). When dyeing the fiber obtained from this polyester with cationic dyes or disperse dyes, in order that it is sufficiently dyed under atmospheric pressure at a temperature of about 100° C. and without use of carriers, it is necessary that the isophthalic acid component having a metal sulfonate group should be contained in the above polyester in an amount of more than 5 mol% based on the total moles of the dicarboxylic acid components of the copolymer. However, in such a polyester containing a large amount of isophthalic acid component having a metal sulfonate group, the melt viscosity of a polymerized reactant is extremely increased because of the thickening action of the isophthalic acid component during the polymerization reaction, so that the polymerization degree of the polymerized reactant becomes difficult to sufficiently increase. As a result, the mechanical strength of the obtained polyester is decreased, leading to a decrease in the polyester fiber strength and making it difficult to spin. Moreover, the polyester copolymerized with a large amount of the isophthalic acid component having a metal sulfonate group becomes poor in resistance to hydrolysis, so that it is difficult to employ this polyester for practical use.

As a polyester which has dyeability with cationic dyes and is readily dyed under atmospheric pressure at a temperature of about 100° C., a polyester copolymerized with a high molecular weight polyoxyethylene glycol or its homologue having a molecular weight of 200 or more has been proposed (Japanese Laid-Open Patent Publication No. 57-63325). The melting point of this polyester is satisfactory and the fiber obtained from this polyester is excellent in easy dyeability. However, the critical disadvantage of this modified polyester is in that the dyed polyester fiber is poor in resistance to light. As a method to lessen the decrease in resistance to light of the dyed polyester fiber and to improve easy dyeability thereof, a polyester comprising, as dicarboxylic acid components of the copolymer, an aromatic dicarboxylic acid such as adipic acid and isophthalic acid or an alkyl ester of these acids has been proposed (Japanese Laid-Open Patent Publication No. 57-66119). Moreover, a polyester comprising, as diol components, diethylene glycol, 1,4-bis(β-hydroxyethoxy)benzene, bis-ethoxylated 2,2-bis(2,5-dimethyl-4-hydroxyphenyl)propane, neopentyl glycol, or cyclohexanedimethanol, and isophthalic acid component having a metal sulfonate group has been proposed. However, the fiber obtained from this polyester is not readily dyed or even though the fiber is readily dyed, the melting point of the polyester is extremely low. The strength of any one of the above-mentioned polyester fibers is not satisfactory.

On the other hand, as a polyester fiber having a satisfactory fiber strength as well as dye-ability with cationic dyes, a polyester in which the content of the isophthalic acid component having a metal sulfonate group is in the range of 0.8 to 1.8 mol% based on the total moles of the dicarboxylic acid components of the copolymer has been proposed (Japanese Laid-Open Patent Publication Nos. 58-126376, 59-30903, 59-47485, 59-66580, 59-71487, 59-71488, and 59-76987). However, there are the following problems. The dyeability of the fiber obtained from the polyester in which the content of the isophthalic acid components having a metal sulfonate group is 2 mol% or less based on the total moles of the dicarboxylic acid component of the copolymer is decreased, and the fiber cannot be dyed in dark colors. Moreover, a polyester comprising, as its dicarboxylic acid components of the copolymer, an isophthalic acid component having a phosphonium sulfonate group has been proposed (Japanese Patent Publication No. 47-22334 and U.S. Pat. No. 3732183). It is considered that the fiber obtained from this polyester has a high strength and dyeability with cationic dyes. However, this kind of polyester is decomposed by itself under the conditions of high heat during the polymerization step, the molding by fusion step, and the like because of the poor resistance to heat of the phosphonium salt of the isophthalic acid component, so that there arises a critical problem that the quality of the polyester obtained is decreased. Furthermore, dyeability of the above polyester fiber is not sufficient.

SUMMARY OF THE INVENTION

The polyester fiber of this invention, which overcomes the above-discussed and numerous other disadvantages and deficiencies of the prior art, is formed from a polyester copolymer of dicarboxylic acids and diols, said dicarboxylic acids comprising an dicarboxylic acid having a metal sulfonate group, wherein at least one molecular terminal of the polyester copolymer is blocked by a sulfonate compound represented by the following general formula (I), a break strength (dry tenactity: DT) of the fiber after being dyed with cationic dyes under atmospheric pressure is 4.0 g/d or more, and the break strength and a break elongation (dry elongation: DE) satisfy the following expression (II), and a degree of dye exhaustion represented by the following expression (III) under the following dyeing conditions is 60% or more:

wherein
A in formula I is an ester-forming functional group, B is a phenyl group or a naphthyl group, $R^1$ is an aliphatic hydrocarbon group having 1 to 20 carbon atoms, an alicyclic hydrocarbon group having 3 to 20 carbon atoms, or an aromatic hydrocarbon group having 6 to 18 carbon atoms, M is an alkali metal or an alkaline earth metal, p and q are independently 0 or 1;

$$DT \times \sqrt{DE} \geq 22 \quad \text{(II)}$$

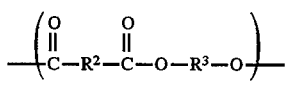

Degree of dye exhaustion = $\frac{X-Y}{X} \times 100$ (III)

wherein

X is an absorbance of dyeing liquid before dyeing, and Y is an absorbance of dyeing liquid after dyeing. Dyeing conditions:

(A) Dye and its concentration: Diacryl Br. Blue H2R—N (10% owf)
(B) Auxiliary and its concentration: $CH_3COONa$ (0.2 g/l), $CH_3COOH$ (0.2 g/l)
(C) Liquor ratio: 1:100
(D) Dyeing temperature and time: Boiling temperature under atmospheric pressure (98° C.)×90 min.

In a preferred embodiment, the polyester copolymer comprises as its main components repeating units represented by the following general formulas (IV) and (V):

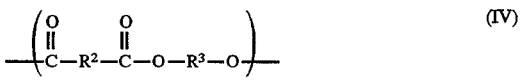

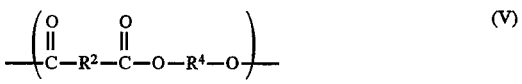

wherein $R^2$ is mainly a terephthalic acid residue, $R^3$ is mainly at least one residue of alkylene glycol selected from the group consisting of ethylene glycol, trimethyl glycol, tetramethyl glycol and 1,4-cyclohexane dimethanol $R^4$ is $(CH_2-CH_2-O)_m R^5 (O-CH_2-CH_2-)_n$ in which $R^5$ is an aliphatic hydrocarbon group or an aromatic hydrocarbon group having 4 to 20 carbon atoms, m and n are the same or different integers, and satisfy the following expression (VI):

$$2 \leq m+n \leq 10 \quad \text{(VI)}$$

In a preferred embodiment, the alkali dissolusion speed constant k is in the range of $7.5 \times 10^{-9}$ to $12.0 \times 10^{-9}$ cm/sec.

In a preferred embodiment, a compound having a metal sulfonate Group is contained in an amount of 2 mol% or more based on the total moles of the dicarboxylic acid components of the polyester copolymer.

In a preferred embodiment, the sulfonate compound represented by the General formula (I) is contained in an amount of 0.1 to 3.0 mol% based on the total moles of the dicarboxylic acid components of the polyester copolymer.

Thus, the invention described herein makes possible the advantages of (1) providing a polyester fiber having dyeability with cationic dyes and easy dyeability under atmospheric pressure at a temperature of about 100° C.; (2) providing a polyester fiber after being dyed excellent in resistance to light; (3) providing a polyester fiber having a high strength; and (4) providing a polyester fiber excellent in resistance to hydrolysis.

These and other advantages of the present invention will become apparent to those skilled in the art upon reading and understanding the following detailed description.

DESCRIPTION OF THE PREFERRED EMBODIMENTS

The polyester fiber of the present invention is a fiber comprising as its components a polyester copolymer. This polyester copolymer comprises a dicarboxylic acid component and a diol component, and preferably comprises as its main components repeating units represented by the above General formulas (IV) and (V).

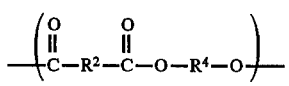

As the dicarboxylic acid components, terephthalic acid or ester-forming derivatives thereof is preferred. The terephthalic acid or ester-forming derivatives thereof is contained preferably in an amount of 80 mol% or more, more preferably in an amount of 95.0 to 99.5 mol% based on the total moles of the dicarboxylic acid components.

Within the range in which the quality of the polyester copolymer is not impaired, it is possible to use, as the carboxylic acid components of the polyester copolymer, aromatic, aliphatic, or allcyclic dicarboxylic acids such as isophthalic acid, naphthalene dicarboxylic acid, diphenyl dicarboxylic acid, diphenoxyethane dicarboxylic acid, adipic acid, sebacic acid, and 1,4-cyclohexane dicarboxylic acid; and hydroxycarboxylic acid such as β-hydroxyethoxy benzoic acid and p-oxybenzoic acid. Moreover, within the range in which the polyester is substantially in a linear shape, it is possible to use, as the carboxylic acid components, polycarboxylic acid such as trimellitic acid and pyromellitic acid. The content of these dicarboxylic acids is preferably less than 20 mol% based on the total moles of the dicarboxylic acid components of the copolymer.

As the ester-forming derivatives of the dicarboxylic acids or the oxycarboxylic acids, a lower alkyl ester of the carboxylic acid, preferably having 1 to 4 carbon atoms is generally used. An ester of glycol such as ethylene glycol can be used.

In order that the polyester fiber of the present invention has excellent dyeability with cationic dyes, it is preferred that 5-metal sulfoisophthalic acid or ester-forming derivatives thereof is contained in the polyester copolymer. The content thereof is preferably in the range of 0.5 to 5.0 mol%, more preferably 0.5 to 3.0 mol%, most preferably 1.0 to 2.0 mol% based on the total moles of the dicarboxylic acid components. When the content of the 5-metal sulfoisophthalic acid or ester-forming derivatives thereof is less than 0.5 mol% based on the total moles of the dicarboxylic acid components, the dyeability with cationic dyes is decreased. Therefore, this content is not preferred. In contrast, when the content is more than 5.0 mol% based on the total moles of the dicarboxylic acid components, this content is not preferred because of the following. Viscosity is increased during the polymerization reaction by the ordinary method, causing the decrease in the polymerization degree of the polyester. As a result, a polyester fiber with a high strength cannot be obtained. Moreover, operability in the course of molding such as spinning is degraded, the melting point of the polyester is decreased, or resistance to light or resistance to hydrolysis of the polyester fiber is decreased.

Metal of the 5-metal sulfoisophthalic acid or ester-forming derivatives thereof is capable of forming salt together with a sulfonic group. Examples of this metal include sodium, potassium, lithium, calcium, barium, lead, and lanthanum. In particular, sodium is preferred.

As the diol components of the polyester copolymer, glycol is preferred. The glycol component is preferably at least one alkylene glycol selected from the group consisting of ethylene glycol, trimethylene glycol, tetramethylene glycol and 1,4-cyclohexane dimethanol or ester-forming derivatives thereof. The content of the alkylene glycol is preferably 80 mol% or more based on the total moles of the glycol components. In particular, it is preferred that the content of the ethylene glycol is 80 mol% or more based on the total moles of the glycol components.

In order that the polyester fiber of the present invention has easy dyeability under atmospheric pressure at a temperature of about 100° C., it is preferred that the glycol represented by the following general formula (VII) is contained in the polyester polymer. The content of the glycol is preferably in the range of 1.0 to 6.0 mol%, more preferably 2.0 to 4.5 mol% based on the total moles of the glycol components of the copolymer.

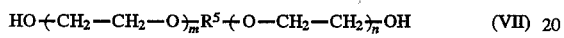
(VII)

In the general formula (VII), $R^5$ is an aliphatic hydrocarbon group or an aromatic hydrocarbon group having 4 to 20 carbon atoms, for example, an aliphatic hydrocarbon group having a straight chain such as $-(CH_2)_6-$ and $-(CH_2)_{10}-$ or an aliphatic hydrocarbon group having a side chain represented by the following formulas (VIII) to (XII):

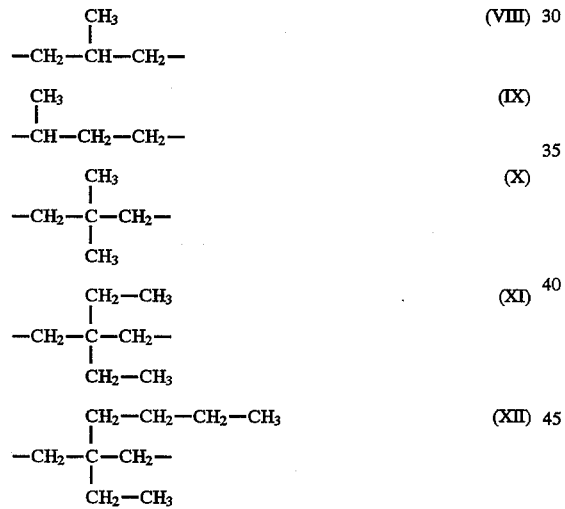

or $R^5$ is an alicyclic hydrocarbon group represented by the following formulas (XIII) to (XVI):

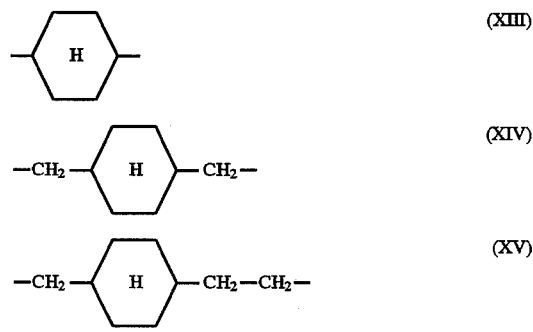

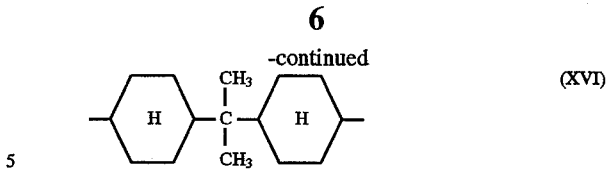

or $R^5$ is an aromatic hydrocarbon group represented by the following formulas (XVII) to (XXII):

(XVII)

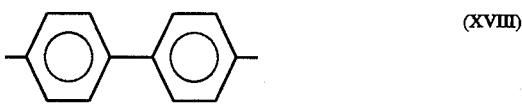
(XVIII)

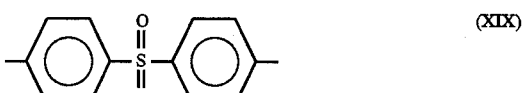
(XIX)

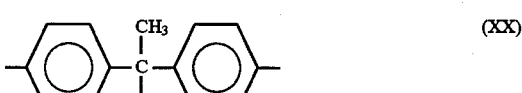
(XX)

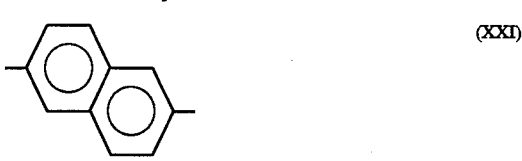
(XXI)

(XXII)

In particular, the aliphatic hydrocarbon groups having a side chain represented by the formulas (VIII) to (XII) are preferred.

In the case of the glycol represented by $HO-R^5-OH$ which is the case wherein both m and n are 0 in the formula (VII) or in the case of a mixture of modified glycols in which the average of (m+n) is less than 1, this kind of the glycol distills in the course of the polycondensation reaction, so that it is not preferred and (m+n) is 2 or more is preferred. On the other hand, when the average of (m+n) is more than 10, the resistance to light of the dyed polyester fiber is extremely decreased. Thus, this value is not preferred because of lack of practicability. The range is preferably $2 \leq m+n \leq 10$, more preferably $3 \leq m+n \leq 6$.

According to the present invention, since the glycol represented by the above general formula (VII) does not distill in the course of the polycondensation reaction for obtaining the polyester copolymer, the content of the glycol component in the polyester to be produced can be kept constant and products of stable quality can be obtained. The easy dyeability of the polyester fiber obtained is extremely great and exhibits excellent resistance to light which cannot be obtained from the polyester copolymer using, as its glycol components of the copolymer, a high molecular weight polyethylene glycol. When the content of the glycol represented by the general formula (VII) is less than 1.0 mol% based on the total moles of the glycol components, the easy dyeability of the polyester fiber obtained is decreased and the intended dyeing property of the fiber cannot be obtained. Therefore, this content is not preferred. In contrast, when the content of the glycol is more than 6.0 mol% based on the total moles of the glycol components, the melting point of the polyester and the resistance to light and resistance to hydrolysis of the polyester fiber obtained are decreased. Therefore, this content is not preferred.

In a method for synthesizing glycol, ethylene oxide can be added to the glycol represented by HO—$R^5$—OH using the ordinary method. In the above, other alkylene oxide such as propylene oxide can be used instead of ethylene oxide within the range in which the effect of the present invention is not impaired.

Within the range in which the effect of the present invention is not impaired, a small amount of the glycol represented by HO—$R^5$—OH or the glycol of the general formula (VII) wherein (m+n)≧10 may be contained. In addition to the above-mentioned glycol represented by HO—$R^5$—OH, a small amount of the following compounds may be also used within the range in which the effect of the present invention is not impaired: diethylene glycol, triethylene glycol, propylene glycol, 1,4-bis(β-hydroxyethoxy)benzene, bisphenol A, bis-ethoxylated 2,2-bis(2,5-dimethyl-4-hydroxyphenyl)propane, diphenylsilanol, etc.

In the above-mentioned polyester copolymers, at least one molecular terminal is blocked by the sulfonate compound represented by the general formula (I). In the general formula (I), A is an ester-forming functional group such as —COOH, —COO$R^6$, —OH, and —O$R^6$, wherein $R^6$ is a lower alkyl group or a phenyl group. As a lower alkyl group represented by $R^6$ for example, a straight chain group or a branch group having 1 to 4 carbon atoms is preferred. B is a phenyl group or a naphthyl group. B can be substituted in any position. $R^1$ is an aliphatic hydrocarbon group having 1 to 20 carbon atoms, an alicyclic hydrocarbon group having 3 to 20 carbon atoms or an aromatic hydrocarbon group having 6 to 18 carbon atoms. The aliphatic hydrocarbon group has preferably 1 to 10 carbon atoms, more preferably 1 to 4 carbon atoms. Examples of this group include methylene, ethylene, trimethylene, tetramethylene, propylene, ethylethylene, and methyltrtmethylene. The alicyclic hydrocarbon group has preferably 3 to 20 carbon atoms, more preferably 3 to 10 carbon atoms, still more preferably 3 to 6 carbon atoms. Examples of this group include cyclopropylene, cyclobutylene, cyclopentylene and cyclohexylene. Examples of the aromatic hydrocarbon groups having 6 to 18 carbon atoms include phenylene, naphthylene, and biphenylene. M is an alkali metal or an alkaline earth metal. Examples of the alkali metal include sodium, potassium, and lithium. Examples of the alkaline earth metal include potassium and magnesium. p and q are independently 0 or 1.

Particularly preferred examples of the sulphonate compounds represented by the general formula (I) include m-sodium sulfobenzoic acid (or its methyl ester or its ethylene glycol ester), p-sodium sulfobenzoic acid (or its methyl ester or its ethylene glycol ester), o-sodium sulfobenzoic acid (or its methyl ester or its ethylene glycol ester), 4-hydroxy-3-sodium sulfobenzoic acid (or its methyl ester or its ethylene glycol ester), 3-hydroxy-4-sodium sulfobenzoic acid (or its methyl ester or its ethylene glycol ester thereof), 3-sodium-sulfobenzoic acid (or its methyl ester or its ethylene glycol ester), etc.

The fiber obtained from the polyester copolymer in which at least one molecular terminal is blocked by the sulfonate compound represented by the general formula (I) has slightly lower dyeability with cationic dyes compared with the fiber obtained from the polyester in which only 5-metal sulfoisophthalic acid or its ester-forming derivative is copolymerized in its main chain as the sulfonate components. However, the viscosity of the polyester in which at least one molecular terminal is blocked by the sulfonate compound is hardly increased in the course of the polymerization reaction, so that the polymerization degree of the polyester copolymer is higher and the strength of the polyester fiber obtained from such a polymer is higher compared with those of the polyester in which only 5-metal sulfoisophthalic acid or its ester-forming derivative is copolymerized in its main chain as the sulfonate components. Moreover, unstretched filaments obtained from the polyester in which at least one molecular terminal is blocked by the sulfonate compound are excellent in stretchability.

The content of the sulfonate compound represented by the general formula (I) is preferably in the range of 0.1 to 3.0 mol%, more preferably 0.5 to 2.0 mol% based on the total moles of the dicarboxylic acid components of the polyester copolymer. When the content of the sulfonate compound represented by the general formula (I) is less than 0.1 mol% based on the total moles of the dicarboxylic acid components, the stretchability of the unstretched filaments obtained from the polyester is decreased and the fiber having the intended physical property cannot be obtained. Therefore, this content is not preferred. In contrast, when the content of the sulfonate compound is more than 3.0 mol% based on the total moles of the dicarboxylic acid components, the polymerization degree of the polyester in the course of the polycondensation is not sufficiently increased, so that a polyester fiber having a high strength cannot be obtained. Moreover, it is preferred that the total content of the compound having a metal sulfonate group, i.e., 5-metal sulfoisophthalic acid or its ester-forming derivatives and the sulfonate compound represented by the general formula (I) is 2 mol% or more based on the total moles of the dicarboxylic acid components of the polyester copolymer. When the total content is less than 2 mol% based on the total moles of the dicarboxylic acid components, the dyeability of the obtained polyester fiber with cationic dyes becomes insufficient. Therefore, this content is not preferred.

The polyester copolymer forming the polyester fiber of the present invention can be obtained by the ordinary methods for producing polyesters, for example, a method comprising ester-exchange reaction of dicarboxylic acid ester and glycol, followed by polycondensation; a method comprising an esterification reaction of dicarboxylic acid and glycol, followed by the polycondensation, etc. When terephthalic acid or its ester-forming derivatives and 5-metal sulfoisophthalic acid or its ester-forming derivatives are used as the above-mentioned dicarboxylic acid components, these can be simultaneously reacted or after these dicarboxylic acid components are separately reacted with glycol components, they can be mixed during the polycondensation step. Moreover, when the method for obtaining the polyester through the esterification reaction is employed, the addition of the glycol represented by the general formula (VII) during the time from immediately before the completion of the esterification reaction to the beginning of the polycondensation, is particularly preferable in that the decomposition of the ether linkage represented by the general formula (VII) is suppressed. In order to block the molecular terminal of the polyester with the sulfonate compound represented by the general formula (I), the sulfonate compound represented by the general formula (I) is added during the arbitrary step in which the synthesis of the polyester is completed, preferably during the time from immediately after the completion of the esterification or the completion of the ester-exchange reaction to the beginning of the polycondensation.

There is no special limit to additives such as catalyst, delustering agent, colorant, and stabilizer used for obtaining the polyester copolymer forming the polyester fiber of the present invention. Examples of a catalyst for improving these reactions include metallic compounds such as sodium, magnesium, calcium, zinc, manganese, tin, tungsten, germanium, titanium, antimony, etc. These additives can be contaminated after the production of the polyester depending on their kinds.

The production of the polyester fiber of the present invention can be conducted under conventional spinning conditions. Thus, for example, the polyester is subjected to extrusion-spinning at a temperature in the range of 170° to 350° C., and at a take-up speed of 100 to 6000 m/min. If desired, the unstretched filaments thus obtained may be stretched 1.1 to 6 times the length. Moreover, a composite fiber can be formed by using the polyester fiber of the present invention as its component. The discharge nozzle used in the spinning step can be made into a special configuration to obtain modified cross-section filaments or hollow filaments. The polyester fiber obtained by the above-mentioned method can be subjected to provisional twisting or subjected to provisional twisting while being stretched to obtain a provisionally twisted and processed thread. The polyester fiber is decreased in quantity with sodium hydroxide so as to be silky. Furthermore, the polyester fiber can be mixed and spun together with fibers, which can be dyed under atmospheric pressure, such as wool, cotton and rayon, and can be coated on elastic filaments to obtain core yarn, covered yarn and the like. Accordingly, the polyester fiber is applicable to various kinds of purposes and can be variously processed in the same way as an ordinary polyester.

It is required that the polyester fiber of the present invention has a break strength (dry tenacity: DT) of 4.0 g/d or more, and it is preferred that a break elongation (dry elongation: DE) is 25 to 35%. The break strength and the break elongation satisfy the following expression (II):

$$DT \times \sqrt{DE} \geq 22 \qquad (II)$$

When the polyester fiber in which ($DT \times \sqrt{DE}$) is less than 22 is used for a cloth for garments such as thin fabrics and sportswear, the strength thereof is not satisfactory.

Moreover, in the polyster fiber of the present invention, a degree of dye exhaustion represented by the following expression (III) is 60% or more, preferably 80% or more and more preferably 90% or more. When the degree of dye exhaustion is less than 60%, it is hard to obtain sufficiently dark colors.

$$\text{Degree of dye exhaustion} = \frac{X - Y}{X} \times 100 \qquad (III)$$

wherein

X is an absorbance of dyeing liquid before dyeing, and Y is an absorbance of dyeing liquid after dyeing.

Dyeing conditions:
(A) Dye and its concentration: Diacryl Br. Blue H2R—N (10% owf)
(B) Auxiliary and its concentration: $CH_3COONa$ (0.2 g/l), $CH_3COOH$ (0.2 g/l)
(C) Liquor ratio: 1:100
(D) Dyeing temperature and time: Boiling temperature under atmospheric pressure (98° C.)× 90 min.

An alkali dissolution speed constant k of the polyester fiber of the present invention defined by the following formula is preferably in the range of $7.5 \times 10^{-9}$ to $12.0 \times 10^{-9}$ cm/sec.

$$\sqrt{R} = -1.68 \times 10^4 k (\sqrt{(\rho/D)}) \times t + 10$$

(wherein R: the insoluble solid content (% by weight) after the passage of t sec., t: the treatment time (sec.), k: the alkali dissolution speed constant (cm/sec.), D: the fineness (denier) of the single filament, and ρ: the density of the single filament).

When the alkali dissolution speed constant k is less than $7.5 \times 10^{-9}$ cm/sec., dyeability with cationic dyes becomes insufficient. In contrast, when the alkali dissolution speed constant k is more than $12.0 \times 10^{-9}$ cm/sec., the dyeability with cationic dyes is not improved any more and the resistance to hydrolysis and physical properties of the fiber deteriorate.

The alkali dissolution speed constant k according to the present invention is measured as follows. First, the polyester copolymer is dried by the ordinary method. This copolymer is spun under the conditions of 600 m/min. and 280° C. by using a spinning base provided with 72 spinning holes in a circular shape having a diameter of 0.3 mm. Then, the copolymer is subjected to stretching heat treatment by using a heating roller of 85° C. and a plate heater of 150° C. under the conditions of stretching speed of 600 m/min. and a stretching multiplying factor which is determined so that the elongation of stretched filament finally obtained is 30%. Thus, stretched filaments of 150 deniers/72 filaments are obtained. The obtained stretched filaments are woven into a knitted fabric, refined by the ordinary method, and preset (180° C.×45 sec.), after which the knitted fabric is treated with 5 g/l of sodium hydroxide at boiling temperature for 4 hours to obtain the insoluble solid content (% by weight). By using the insoluble solid content, the alkali dissolution speed constant k is calculated from the above formula. As the value of k is larger, the mobility or hydrophilic property of a molecular chain is increased. Therefore, the diffusivity of cationic dyes is improved.

Generally, the viscosity of polyester comprising in its main chain as its copolymer components, 5-metal sulfoisophthalic acid or ester-forming derivatives thereof is increased in the course of the polymerization reaction. It is considered that this increase in the viscosity is attributed to the formation of a false cross-linking structure caused by association of metal sulfonate groups in the polyester main chain. In the polyester copolymer forming the polyester fiber of the present invention, the amount of copolymerized 5-metal sulfoisophthalic acid or ester-forming derivative component thereof in the main chain of the polyester copolymer can be decreased by introducing the sulfonate compound represented by the general formula (I) into molecular terminals of the polyester, so that the viscosity of the polyester in the course of the polymerization reaction can be prevented from being increased. As a result, since a polyester copolymer having a high polymerization degree can be obtained, a polyester fiber having a high strength can be obtained. Moreover, the elongation of the unstretched filaments obtained can be improved by the association of the metal sulfonate groups of the sulfonate compound introduced into molecular terminals of the polyester. Furthermore, a polyester fiber obtained when a predetermined amount of the glycol represented by the general formula (VII) is used as a copolymer component exhibits easy dyeability under atmospheric pressure at a temperature of about 100° C. and resistance to light.

EXAMPLES

Hereinafter, the present invention will be described by way of illustrating the examples. In the examples, "parts" refer to "parts by weight". The method for measuring characteristic values is as follows.

1) Melting point of the polyester: measured by DSC, for a sample quantity of 10 mg, under a nitrogen atmosphere at a temperature elevation speed of 20° C./min.
2) Intrinsic viscosity of the polyester: measured in a mixed solution of phenol/tetrachloroethane (6:4 in weight ratio) at 30° C.
3) DT×√DE: A sample was stretched by a "Tensiron" UTM-4L type stretching machine (produced by Toyo Baldwin Co., Ltd.) under the conditions of a gage length of 200 mm, an initial load of 1/30 g/d, and a stretching speed of 200 mm. Then, the break strength (g/d) and the break elongation (%) of the fiber was obtained from an S-S curve plotted at a recording speed of 500 mm/min. Then DT×√DE was calculated.
4) Degree of dye exhaustion: A sample was dyed with 10% owl Diacryl Br. Blue H2R—N (produced by Mitsubishi Kasei Co., Ltd., cationic dyes), with the addition of 0.2 g/l of acetic acid and 0.2 g/l of sodium acetate, at a bath ratio of 1:100, at the atmospheric pressure boiling point of 98° C. for 90 min. Then an absorbance X of the dyeing liquid before dyeing and an absorbance Y of the dyeing liquid after dyeing were measured, and a degree of dye exhaustion was calculated from the above-mentioned expression (III).

Example 1 to 10, and Comparative Examples 1 to 11

One thousand parts of dimethyl terephthalate (DMT), a prescribed amount (shown in Table 1) of 5-sodium sulfoisophthalic acid dimethyl ester (DSN), 700 parts of ethylene glycol, a prescribed amount (shown in Table 1) of the glycol of the general formula (VII) wherein $R^5$ is a 2,2-dimethyl propylene group and (m+n) is 4 were placed in an ester-exchange reactor. To this mixture, 0.33 parts (0.030 mol% with respect to (DMT+DSN)) of $(CH_3COO)_2Zn.2H_2O$, 0.39 parts (0.025 mol% with respect to (DMT+DSN)) of antimony triacetate, and sodium acetate (5 mol% with respect to a monomer having a metal sulfonate group) as a depressant for the generation of ethylene glycol were added. The ester-exchange reaction was carried out by elevating the temperature from 140° to 230° C. in three hours in an atmosphere of nitrogen, while distilling away the by-produced methanol. To this reaction system, 0.026 parts (0.036 mol% with respect to (DMT+DSN)) of trimethyl phosphate was added, and the reaction system was stirred for 15 min. The resulting product was transferred into a polycondensation tank preheated to 230° C. To this product, a prescribed amount (shown in Table 1) of m-sodium sulfobenzoic acid (SBA) was added as 20% by weight of solution of ethylene glycol and was stirred for 20 min. in an atmosphere of nitrogen. In 60 min. after this, while the inside temperature was elevated from 230° to 275° C. for 60 min., the pressure of the reaction system was gradually reduced to 0.1 mmHg. Thereafter, the polycondensation reaction was conducted at 275° C. and 0.1 mmHg until the melt viscosity of the resulting polymer reached 3400 poises to obtain a polyester copolymer having a prescribed composition.

This polymer was dried by the ordinary method and spun by means of an extrusion spinning machine at a spinning temperature of 285° C., at a winding speed of 600 m/min. The unstretched filaments thus obtained were subjected to stretching heat treatment by using a heating roller of 85° C. and a plate heater of 150° C. under the condition of stretching multiplying factor which was determined so that the ductility of stretched thread finally obtained become 30%. Thus, stretched filaments of 150 denlets/72 filaments were obtained. The obtained stretched filaments were woven into a knitted fabric, refined by the ordinary method, and preset (180° C.×45 sec.), after which the knitted fabric was treated with 5 g/l of sodium hydroxide solution at the boiling temperature for 4 hours to obtain the insoluble solid content (% by weight). Degree of dye exhaustion and (DT×√DE) were measured by the above method. The results of these measurements, the compositions of the polyester copolymers and the melting points of the polyester copolymers and the intrinsic viscosity are shown in Table 1.

Example 11

A polyester copolymer was obtained in the same way as in Example 5 except that 4-hydroxy-3-sodium sulfobenzoic acid (HSB) was added instead of m-sodium sulfobenzoic acid (SBA). The results are shown in Table 1.

Examples 12 and 13

A polyester copolymer was obtained in the same way as in Example 3 except that a glycol of the general formula (VII) in which $R^5$ is 2-n-butyl-2-ethyl propylene group and (m+n) is 4 was added. The results are shown in Table 1.

Example 14

A polyester copolymer was obtained in the same way as in Example 7 except that a glycol of the general formula (VII) in which $R^5$ is 2-n-butyl-2-ethyl propylene group and (m+n) is 4 was added. The results are shown in Table 1.

TABLE 1

| | Components in polyester copolymer | | | | | | | |
|---|---|---|---|---|---|---|---|---|
| | DSN (mole % based on the total moles of the acid components | Sulfonate compound (mole % based on the total moles of the acid components) 2) | Glycol (mole % based on the total moles the glycol components) 3) | Intrinsic viscosity 1) | Melting point (°C.) | DT × DE | Degree of dye exhaustion (%) | $k \times 10^9$ (cm/sec.) |
| Example 1 | 1.5 | 1.5 | 2.1 | 0.47 | 254 | 22.3 | 64.2 | 7.64 |
| Example 2 | 1.5 | 2.0 | 2.1 | 0.44 | 251 | 22.5 | 99.2 | 8.12 |
| Example 3 | 1.5 | 1.5 | 3.1 | 0.49 | 248 | 23.9 | 97.9 | 8.43 |
| Example 4 | 1.5 | 1.5 | 4.2 | 0.50 | 244 | 22.2 | 98.7 | 9.18 |
| Example 5 | 2.0 | 1.0 | 2.1 | 0.47 | 254 | 22.1 | 80.0 | 9.52 |
| Example 6 | 1.0 | 2.0 | 2.1 | 0.48 | 253 | 22.2 | 67.5 | 7.60 |

TABLE 1-continued

| | Components in polyester copolymer | | | | | | | |
|---|---|---|---|---|---|---|---|---|
| | DSN (mole % based on the total moles of the acid components | Sulfonate compound (mole % based on the total moles of the acid components) 2) | Glycol (mole % based on the total moles the glycol components) 3) | Intrinsic viscosity 1) | Melting point (°C.) | DT × DE | Degree of dye exhaustion (%) | k × 10$^9$ (cm/sec.) |
| Example 7 | 1.0 | 1.5 | 4.2 | 0.51 | 247 | 24.4 | 94.2 | 7.82 |
| Example 8 | 1.0 | 1.7 | 4.2 | 0.51 | 246 | 24.1 | 97.8 | 7.83 |
| example 9 | 0.5 | 1.7 | 4.2 | 0.54 | 251 | 25.3 | 84.5 | 7.52 |
| Example 10 | 2.0 | 2.0 | 2.1 | 0.44 | 248 | 22.8 | 99.0 | 11.11 |
| Example 11 | 2.0 | 1.0 | 2.1 | 0.47 | 250 | 22.5 | 76.3 | 9.37 |
| Example 12 | 1.5 | 1.5 | 3.1 | 0.50 | 247 | 24.7 | 98.2 | 8.78 |
| Example 13 | 1.2 | 1.5 | 3.1 | 0.52 | 250 | 25.5 | 96.3 | 8.01 |
| Example 14 | 1.0 | 1.5 | 4.2 | 0.54 | 244 | 23.5 | 97.8 | 7.95 |
| Comparative Example 1 | 1.5 | 0 | 1.5 | 0.54 | 254 | 22.4 | 16.5 | 3.52 |
| Comparative Example 2 | 1.5 | 1.5 | 1.5 | 0.46 | 255 | 22.0 | 52.0 | 6.11 |
| Comparative Example 3 | 1.5 | 1.5 | 6.3 | 0.52 | 240 | 21.8 | 99.0 | 12.77 |
| Comparative Example 4 | 2.5 | 0.5 | 2.1 | 0.47 | 252 | 18.9 | 88.2 | 13.62 |
| Comparative Example 5 | 3.0 | 1.0 | 2.1 | 0.42 | 247 | 19.7 | 99.5 | 15.01 |
| Comparative Example 6 | 3.0 | 2.0 | 2.1 | 0.39 | 248 | 17.0 | 99.8 | 15.97 |
| Comparative Example 7 | 1.0 | 0 | 4.2 | 0.61 | 249 | 25.5 | 25.5 | 2.83 |
| Comparative Example 8 | 0 | 1.0 | 4.2 | 0.63 | 248 | 27.5 | 22.7 | 1.87 |
| Comparative Example 9 | 3.0 | 0 | 2.1 | 0.45 | 250 | 16.5 | 96.8 | 14.05 |
| Comparative Example 10 | 3.0 | 0 | 0 | 0.45 | 256 | 19.8 | 29.3 | 7.29 |
| Comparative Example 11 | 0 | 2.5 | 0 | 0.42 | 258 | 24.0 | 27.6 | 4.24 |

1) Polymerization end; 1800 poises (275° C.)
2) Sulfonate compound represented by the formula (I)
3) Glycol represented by the formula (VII)

As is apparent from Table 1, it is understood that the polyester fiber of the present invention has excellent physical properties and dyability with cationic dyes and easy dyeability under atmospheric pressure at a temperature of about 100° C. In contrast, in the Comparative Examples, fiber which satisfies the conditions of DT×√DE≧22 and 60% or more of degree of dye exhaustion cannot be obtained. Moreover, according to the present invention, the copolymerized amount of 5-metal sulfoisophthalic acid or its ester-forming derivative as a sulfonate component in the main chain of the polyester copolymer can be reduced by introducing the sulfonate compound represented by the general formula (I) into the molecular terminal of the polyester copolymer. Therefore, the thickening action in the course of the polycondensation of polyester copolymer is decreased, and the degree of the polymerization of the polyester copolymer obtained under the usual conditions can be increased. Furthermore, the easy dyability under atmospheric pressure at a temperature of about 100° C. and resistance to light can be provided by containing the glycol represented by the general formula (VII) as a copolymer component.

According to the present invention, a polyester fiber which has a high strength, dyeability with cationic dyes, easy dyeability under atmospheric pressure at a temperature of about 100° C. and which is excellent in resistance to light and resistance to hydrolysis can be provided. Moreover, The polyester fiber can be widely applied to the fields in which strength and fashion properties are required.

Various other modifications will be apparent to and can be readily made by those skilled in the art without departing from the scope and spirit of this invention. Accordingly, it is not intended that the scope of the claims appended hereto be limited to description as set forth herein, but rather that the claims be broadly construed.

What is claimed is:

1. A polyester fiber formed from a polyester copolymer and a sulfonate compound, wherein said polyester copolymer is a copolymer of a first unit having the formula

and a second unit having the formula

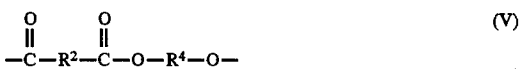

wherein
R$^2$ is mainly terephthalic acid, R$^3$ is mainly alkylene glycol, wherein said alkylene glycol is selected from at least one of the group consisting of ethylene glycol, trimethylene glycol, tetramethylene glycol and 1,4-cyclohexane dimethanol, R$^4$ is $-(CH_2-CH_2-O)_m-R^5-(O-CH_2-CH_2)_n-$, wherein R$^5$ is selected from the group consisting of an aliphatic hydrocarbon group having 4 to 20 carbon atoms and an aromatic hydrocarbon group having 4 to 20 carbon atoms, m and n are the same or different integers, and satisfy the following expression (VI):

$$2 \leq m+n \leq 10 \tag{VI}$$

wherein said first unit further comprises a metal sulfonate group, wherein said sulfonate compound has the formula

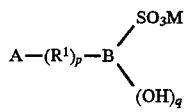 (I)

wherein

A is an ester-forming functional group, B is selected from the group consisting of phenyl and naphthyl, $R^1$ is selected from the group consisting of an aliphatic hydrocarbon group having 1 to 20 carbon atoms, an alicyclic hydrocarbon group having 3 to 20 carbon atoms, and an aromatic hydrocarbon group having 6 to 18 carbon atoms, M is an alkali metal or an alkaline earth metal, p is 0 or 1, and q is 1;

wherein the content of said sulfonate compound of formula (I) in said polyester fiber is in the range of 0.1 to 3.0 mol% of total dicarboxylic acid, the total content of said metal sulfonate group and said sulfonate compound in said polyester fiber is at least 2 mol% of total dicarboxylic acid, and at least one molecular terminal of said polyester copolymer is blocked by said sulfonate compound of formula (I).

2. A polyester fiber according to claim 1, wherein an alkali dissolution speed constant k is in the range of $7.5 \times 10^{-9}$ to $12.0 \times 10^{-9}$ cm/sec.

3. The polyester fiber of claim 1, wherein a break strength (dry tenacity: DT) of said polyester fiber after being dyed with cationic dyes under atmospheric pressure is 4.0 g/d or more, and the break strength and a break elongation (dry elongation: DE) satisfy the following expression (II), and a degree of dye exhaustion represented by the following expression (III) under the following dyeing conditions is 60% or more; and $$DT \times \sqrt{DE} \geq 22 \tag{II}$$

$$\text{Degree of dye exhaustion} = \frac{X-Y}{X} \times 100 \tag{III}$$

wherein

X is an absorbance of dyeing liquid before dyeing, and Y is an absorbance of dyeing liquid after dyeing under the following conditions:
(A) Dye and its concentration: Diacryl Br. Blue H2R—N (10% owf);
(B) Auxiliary and its concentration: $CH_3COONa$ (0.2 g/l), $CH_3COOH$ (0.2 g/l);
(C) Liquor ratio: 1:100; and
(D) Dyeing temperature and time: Boiling temperature under atmospheric pressure (98° C.) 90 min.

4. A polyester fiber according to claim 3, wherein an alkali dissolution speed constant k is in the range of $7.5 \times 10^{-9}$ cm/sec.

5. The polyester fiber of claim 1, wherein said ester-forming functional group is selected from the group consisting of —COOH, —COOR, —OH, and OR, wherein R is selected from the group consisting of lower alkyl and phenyl.

6. A polyester fiber formed from a polyester copolymer and a sulfonate compound, wherein said polyester copolymer is a copolymer of a first unit having the formula

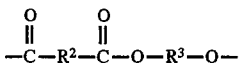 (IV)

and a second unit having the formula

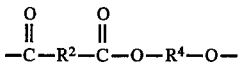 (V)

wherein $R^2$ is mainly terephthalic acid, $R^3$ is mainly alkylene glycol, wherein said alkylene glycol is selected from at least one of the group consisting of ethylene glycol, trimethylene glycol, tetramethylene glycol, and 1,4-cyclohexane dimethanol, $R^4$ is $-(CH_2-CH_2-O)_m-R^5-(O-CH_2-CH_2)_n-$, wherein $R^5$ is selected from the group consisting of aliphatic hydrocarbyl groups having 4 to 20 carbon atoms and aromatic hydrocarbyl groups having 4 to 20 carbon atoms, m and n are the same or different integers, and satisfy the following expression (VI):

$$2 \leq m+n \leq 10 \tag{VI}$$

wherein said first unit further comprises a metal sulfonate group, wherein said sulfonate compound has the formula

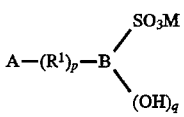 (I)

wherein

A is —OR wherein R is selected from the group consisting of a lower alkyl and phenyl, B is selected from the group consisting of phenyl and naphthyl, M is selected from the group consisting of alkali and alkaline earth metals, and p and q are 0;

wherein the content of said sulfonate compound of formula (I) in said polyester fiber is in the range of 0.1 to 3.0 mol% of total dicarboxylic acid, the total content of said metal sulfonate group and said sulfonate compound in said polyester fiber is at least 2 mol% of total dicarboxylic acid, and at least one molecular terminal of said polyester copolymer is blocked by said sulfonate compound of formula (I).

7. The polyester fiber of claim 6, wherein a break strength (dry tenacity: DT) of said polyester fiber after being dyed with cationic dyes under atmospheric pressure is 4.0 g/d or more, and the break strength and a break elongation (dry elongation: DE) satisfy the following expression (II), and a degree of dye exhaustion represented by the following expression (III) under the following dyeing conditions is 60% or more; and $$DT \times \sqrt{DE} \geq 22 \tag{II}$$

$$\text{Degree of dye exhaustion} = \frac{X-Y}{X} \times 100, \tag{III}$$

wherein

X is an absorbance of dyeing liquid before dyeing, and Y is an absorbance of dyeing liquid after dyeing under the following conditions:
(A) Dye and its concentration: Diacryl Br. Blue H2R—N (10% owf);

(B) Auxiliary and its concentration: $CH_3COONa$ (0.2 g/l), $CH_3COOH$ (0.2 g/l);

(C) Liquor ratio: 1:100; and (D) Dyeing temperature and time: Boiling temperature under atmospheric pressure (98° C.)×90 min.

8. A polyester fiber according to claim 7, wherein an alkali dissolution speed constant k is in the range of $7.5 \times 10^{-9}$ to $12 \times 10^{-9}$ cm/sec.

9. A polyester fiber formed from a polyester copolymer and a sulfonate compound, wherein said polyester copolymer is a copolymer of a first unit having the formula

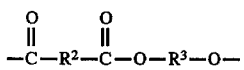
(IV)

and a second unit having the formula

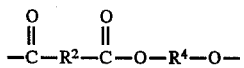
(V)

wherein $R^2$ is mainly terephthalic acid, $R^3$ is mainly alkylene glycol, wherein said alkylene glycol is selected from the group consisting of ethylene glycol, trimethylene glycol, tetramethylene glycol and 1,4-cyclohexane dimethanol, $R^4$ is $-(CH_2-CH_2-O)_m-R^5-(O-CH_2-CH_2)_n-$, wherein $R^5$ is selected from the group consisting of aliphatic hydrocarbyl groups having 4 to 20 carbon atoms and aromatic hydrocarbyl groups having 4 to 20 carbon atoms, and m and n are the same or different and integers satisfying the following expression (VI):

$$2 \leq m+n \leq 10 \quad \text{(VI),}$$

wherein said first unit further comprises a metal sulfonate group, wherein said sulfonate compound has the formula

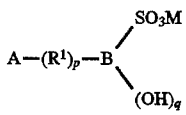
(I)

wherein

A is an ester-forming functional group selected from the group consisting of —COOH and —OR wherein R is selected from the group consisting of lower alkyl and phenyl, B is selected from the group consisting of phenyl and naphthyl, $R^1$ is an aliphatic hydrocarbon group having 1 to 20 carbon atoms, M is selected from the group consisting of alkali and alkaline earth metals, p is 1, and q is 0;

wherein the content of said sulfonate compound of formula (I) in said polyester fiber is in the range of 0.1 to 3.0 mol% of total dicarboxylic acid, the total content of said metal sulfonate group and said sulfonate compound in said polyester fiber is at least 2 mol% of total dicarboxylic acid, and at least one molecular terminal of said polyester copolymer is blocked by said sulfonate compound of formula (I).

10. The polyester fiber of claim 9, wherein a break strength (dry tenacity: DT) of said polyester fiber after being dyed with cationic dyes under atmospheric pressure is 4.0 g/d or more, and the break strength and a break elongation (dry elongation: DE) satisfy the following expression (II), and a degree of dye exhaustion represented by the following expression (III) under the following dyeing conditions is 60% or more; and $$DT \times \sqrt{DE} \geq 22 \quad \text{(II)}$$

$$\text{Degree of dye exhaustion} = \frac{X-Y}{X} \times 100, \quad \text{(III)}$$

wherein

X is an absorbance of dyeing liquid before dyeing, and Y is an absorbance of dyeing liquid after dyeing under the following conditions:

(A) Dye and its concentration: Diacryl Br. Blue H2R—N (10% owf);

(B) Auxiliary and its concentration: $CH_3COONa$ (0.2 g/l), $CH_3COOH$ (0.2 g/l);

(C) Liquor ratio: 1:100; and (D) Dyeing temperature and time: Boiling temperature under atmospheric pressure (98° C.)×90 min.

11. A polyester fiber according to claim 10, wherein an alkali dissolution speed constant k is in the range of $7.5 \times 10^{-9}$ to $12 \times 10^{-9}$ cm/sec.

12. A polyester fiber formed from a polyester copolymer and a sulfonate compound, wherein said polyester copolymer is a copolymer of a first unit having the formula

(IV)

and a second unit having the formula

(V)

wherein $R^2$ is mainly terephthalic acid, $R^3$ is mainly alkylene glycol, wherein said alkylene glycol is selected from the group consisting of ethylene glycol, trimethylene glycol, tetramethylene glycol and 1,4-cyclohexane dimethanol, $R^4$ is $-(CH_2-CH_2-O)m-R^5-(O-CH_2-CH_2)_n-$, wherein $R^5$ is selected from the group consisting of aliphatic hydrocarbyl groups having 4 to 20 carbon atoms and aromatic hydrocarbyl groups having 4 to 20 carbon atoms, m and n are the same or different and integers satisfying the following expression (VI):

$$2 \leq m+n \leq 10 \quad \text{(VI),}$$

wherein said first unit further comprises a metal sulfonate group, wherein said sulfonate compound has the formula

(I)

wherein

A is an ester-forming functional group selected from the group consisting of —COOH, —COOR, —OH, and —OR, wherein R is selected from the group consisting of lower alkyl and phenyl, B is selected from the group consisting of phenyl and naphthyl, $R^1$ is selected from the group consisting of alicyclic hydrocarbyl groups having 3 to 20 carbon atoms and aromatic hydrocarbyl groups having 6 to 18 carbon atoms, M is selected from the group consisting of alkali and alkaline earth metals, p is 1, and q is 0;

wherein the content of said sulfonate compound of formula (I) in said polyester fiber is in the range of 0.1 to 3.0 mol% of total dicarboxylic acid, the total content of said metal sulfonate group and said sulfonate compound in said polyester fiber is at least 2 mol% of total dicarboxylic acid, and at least one molecular terminal of said polyester copolymer is blocked by said sulfonate compound of formula (I).

13. The polyester fiber claim 12, wherein a break strength (dry tenacity: DT) of said polyester fiber after being dyed with cationic dyes under atmospheric pressure is 4.0 g/d or more, and the break strength and a break elongation (dry elongation: DE) satisfy the following expression (II), and a degree of dye exhaustion represented by the following expression (III) under the following dyeing conditions is 60% or more; and $$DT \times \sqrt{DE} \geq 22 \quad \text{(II)}$$

$$\text{Degree of dye exhaustion} = \frac{X-Y}{X} \times 100, \quad \text{(III)}$$

wherein

X is an absorbance of dyeing liquid before dyeing, and Y is an absorbance of dyeing liquid after dyeing under the following conditions:
 (A) Dye and its concentration: Diacryl Br. Blue H2R—N (10% owf);
 (B) Auxiliary and its concentration: $CH_3COONa$ (0.2 g/l), $CH_3COOH$ (0.2 g/l);
 (C) Liquor ratio: 1:100; and
 (D) Dyeing temperature and time: Boiling temperature under atmospheric pressure (98° C.)×90 min.

14. A polyester fiber according to claim 13, wherein an alkali dissolution speed constant k is in the range of $7.5 \times 10^{-9}$ to $12 \times 10^{-9}$ cm/sec.

* * * * *

UNITED STATES PATENT AND TRADEMARK OFFICE
CERTIFICATE OF CORRECTION

PATENT NO. : 5,637,398
DATED : June 10, 1997
INVENTOR(S) : Araki, et. al.

It is certified that error appears in the above-identified patent and that said Letters Patent is hereby corrected as shown below:

In Table 1, Column 13, lines 15 through 36, the numerals should be placed next to Comparative instead i.e.

Comparative 1
        Example

In Column 13, line 63, "Moreover, The" should read --Moreover, the--.

In Column 13, line 66, "Various other." should read -- Various other--.

In Claim 1, Column 15, line 56, "(98°C.)90 min." should read -- $(98°C.)x-90-min.$ --

In Claim 12, Column 18, line 42, "0)m" should read --$0)_m$--.

UNITED STATES PATENT AND TRADEMARK OFFICE
CERTIFICATE OF CORRECTION

PATENT NO. : 5,637,398
DATED : June 10, 1997
INVENTOR(S) : Araki, et. al.

It is certified that error appears in the above-identified patent and that said Letters Patent is hereby corrected as shown below:

In Column 3, line 43, "dissolusion" should read --dissolution--.

In Column 3, line 46, "Group" should read --group--.

In Column 3, line 50, "General" should read --general--.

In Column 4, line 4, "General" should read --general--.

In Column 4, line 21, "allcyclic" should read --alicyclic--.

In Column 7, line 41, "methyltrtmethylene" should read --methyltrimethylene--.

In Column 12, line 22, "150 denlets" should read --150 deniers--.

In Table 1, Column 13, line 6, under the DSN heading "components" should read --components)--.

In Table 1, Column 13, line 9, "example" should read --Example--.

Signed and Sealed this

Sixteenth Day of December, 1997

Attest:

Attesting Officer

BRUCE LEHMAN
Commissioner of Patents and Trademarks